UNITED STATES PATENT OFFICE.

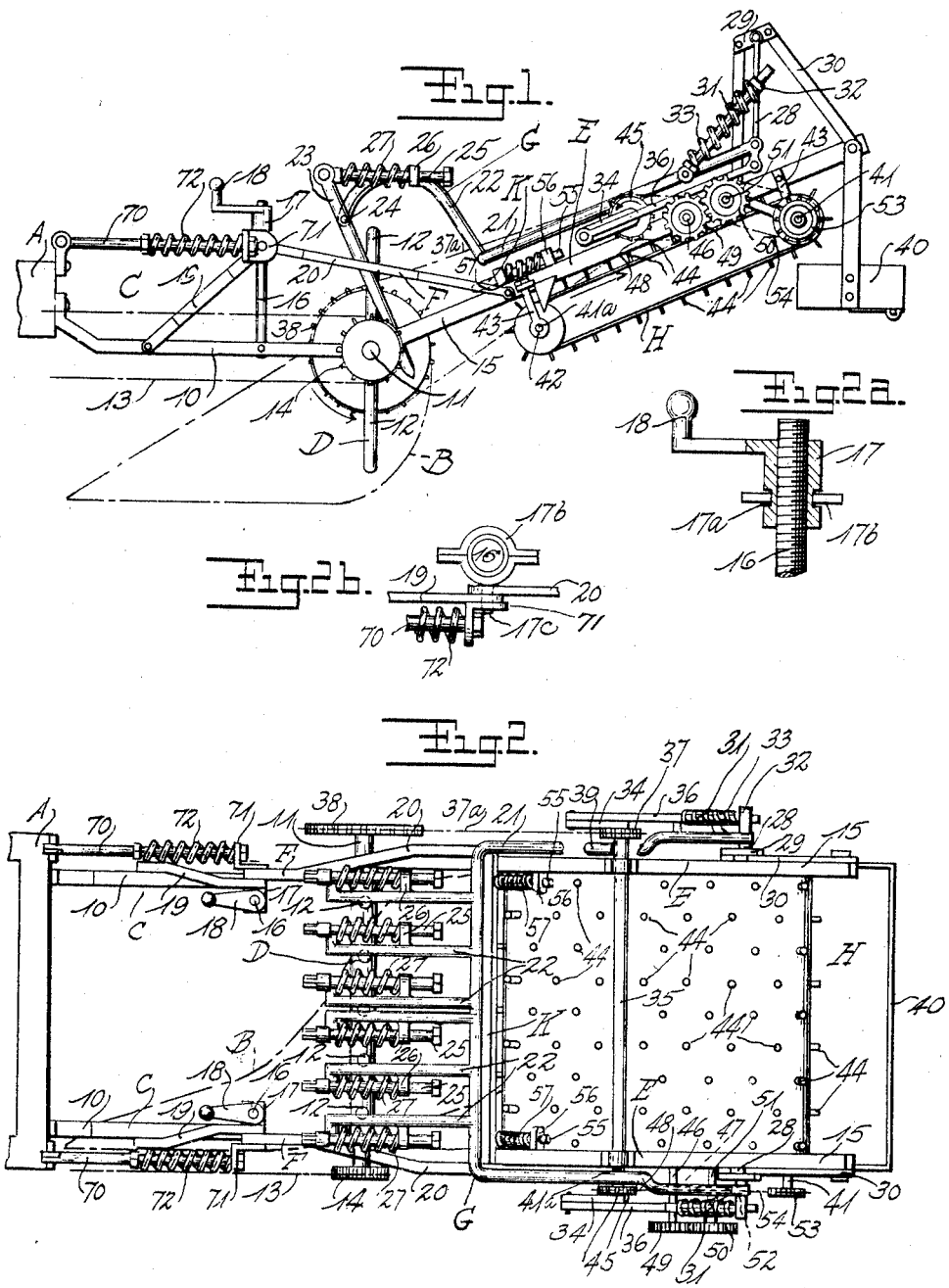

JUAN ALBERTO VALDERRAMA RICORDI, OF NEW YORK, N. Y.

GRASS-HARVESTER.

1,373,213.　　　　Specification of Letters Patent.　　Patented Mar. 29, 1921.

Application filed April 10, 1918. Serial No. 227,783.

*To all whom it may concern:*

Be it known that I, JUAN ALBERTO VALDERRAMA RICORDI, a citizen of the Republic of Peru, residing at 117 West 49th street, city, county, and State of New York, U. S. A., have invented new and useful Improvements in Grass-Harvesters, of which the following is a specification.

My invention relates to harvesters, and more particularly to a harvester which is adapted to remove the grass from the soil, although it is to be understood that the invention is not limited to such adaptation.

An object of my invention is the provision of a grass harvester which is used in conjunction with a plow, and which effectively disintegrates the soil as it is plowed, removing the grass therefrom and delivering the same to a conveyer.

Another object of my invention is the provision of a grass harvester having a rake which is capable of reciprocating curvilinear movement to assist a disintegrating device in breaking the soil and to remove the grass therefrom and deliver the same to a conveyer belt, the rake being yieldingly supported to prevent breakage of the same when encountering stones or rocks, and adjustable with relation to the disintegrating device.

I will describe a form of harvester embodying my invention and will then point out the novel features thereof in claims.

In the accompanying drawings,

Figure 1 is a view showing in side elevation one form of harvester embodying my invention;

Fig. 2 is a view showing in top plan the harvester shown in Fig. 1;

Figs. 2ᵇ and 2ᵃ are top plan and sectional views, respectively, showing in detail the means for adjusting the frame F.

Similar reference characters refer to similar parts throughout the several views.

Referring to the drawings in detail, A designates the draft beam of a plow frame for drawing a plow B which latter is shown in dot and dash lines in order to simplify the drawings. Secured to the draft beam A is the stationary frame indicated generally at C and which comprises spaced bars 10 which have their forward ends bent upwardly and secured to the rear side of the draft beam A. The rear ends of the bars 10 are formed with bearings in which a shaft 11 is journaled. Fixed to the shaft 11 at diametrically opposite points thereon are two longitudinal sets of radially extending teeth 12, which constitute what I term a disintegrating device D. This disintegrating device D is disposed adjacent the mold board of the plow B as clearly shown in Fig. 1 and is adapted to disintegrate the soil as it reaches the mold board, for the purpose of permitting the ready removal of the grass therefrom. The disintegrating device D is continuously rotated in the direction of the arrow, as shown in Fig. 1 by suitable means (not shown) carried by the plow frame and operatively connected to the shaft 11 through the medium of a chain 13 and a gear 14 fixed to one end of the shaft 11.

Pivotally connected to the stationary frame C is a movable frame E upon which the raking and conveying mechanism is mounted. This movable frame E, as shown in Fig. 2, comprises spaced parallel bars 15 which are pivotally connected at their forward ends to the shaft 11. The frame E normally occupies an inclined position with relation to the stationary frame C and is supported in this position by means of a frame generally indicated at F. The frame F is adjustable to vary the normal position of the movable frame E. As here shown, the frame F comprises two vertically disposed standards 16, each of which is pivotally connected at its lower end to the corresponding bar 10 of the frame C. As shown in Figs. 2ᵃ and 2ᵇ, the upper end of each standard 16 is threaded to receive a nut 17, and integrally formed with the nut 17 is a handle 18, by means of which the nut is rotated in one direction or the other. The nut 17 is formed with an annular channel 17ᵃ in which is mounted a sectional ring 17ᵇ so that when the nut is rotated in one direction or the other it will move the ring 17ᵇ upwardly or downwardly of the standard. The ring is formed with a pivot pin 17ᶜ upon which one end of a link 19 is pivotally connected while its opposite end is pivoted to the corresponding bar 10. The standards 16 are operatively connected to the movable frame E by means of rods 20 which are also pivotally connected to the pins 17ᶜ and to the bar 15 of the frame E. By this arrangement, it will be evident that as the handles 18 are rotated in one direction or the other, the links 19 and rods 20 will be moved forwardly or rearwardly to lower or elevate the movable frame E.

To permit the frame F to yield to any sudden jar or strain, a pair of rods 70 are pivotally connected to the draft beam A and are slidably mounted in bearing plates 71 pivoted on the pins 17°, while springs 72 surround the rods and bias the bearing plates, and consequently the rods 20, to the positions shown in Fig. 1. Such an arrangement permits the frame F to assume any position and at the same time allows it to yield when pressure is exerted in the direction of the draft beam thereon, thus preventing distortion or breaking of the frame.

G designates generally a rake which is carried by the movable frame E and which is adapted to coact with the disintegrating device D to assist the same in breaking up the clods of earth, the primary purpose, however, being to remove the grass from the earth and to convey the same to a conveyer belt H carried by the frame E. To perform this function it is necessary to provide mechanism for imparting a reciprocating curvilinear movement to the rake, such mechanism being also carried by the movable frame E.

As shown in the drawings the rake G comprises a substantially U-shaped yoke 21, the central portion of which is formed at regularly spaced intervals with upwardly and outwardly extending arcuate shaped arms 22. Secured to the outer end of each of the arms 22 is a linear tooth 23, such teeth being pivotally connected adjacent their upper ends to the arms as at 24 and having their lower ends pointed. In order to bias the teeth 23 to predetermined positions and at the same time to permit a yielding movement thereof in the event the teeth encounter an obstacle, such as a stone or rock, I provide each tooth with a rod 25 pivotally connected to the upper end of the tooth and slidably mounted in a bearing 26 formed on the corresponding arm 22. Surrounding the rod 25 and interposed between the bearing 26 and the pivoted end of the rod is an expansible spring 27. The tendency of the spring is to force the rod 25 forwardly so as to cause the tooth to assume an inclined position with relation to the vertical, as clearly shown in Fig. 1, and at the same time permitting the tooth to swing about its pivot when sufficient pressure is exerted thereon to overcome the tension of the spring, such as when striking a stone.

The free ends of the parallel portions of the yoke 21 are pivotally supported by means of links 28 which latter are in turn pivotally connected to bars 29 supported by beams 30 fixed to the bars 15 of the movable frame E. To allow the yoke 21 to yield when the teeth 23 encounter an obstacle, and thus prevent breaking of the same, I provide a device similar to that used for the teeth 23, and the adjustable frame F, each device as here shown comprising a rod 31 pivotally connected to the corresponding parallel portion of the yoke and slidably mounted in a bearing 32 formed on the link 28, and the expansible spring 33 interposed between the bearing and the pivotal connection of the rod.

Reciprocating motion is imparted to the yoke 21 by means of cranks 34 fixed to the ends of a shaft 35 and operatively connected to the free ends of the yoke by means of connecting rods 36. The shaft 35 is driven by the shaft 11 and is operatively connected thereto by a toothed gear 37 fixed to one end of the shaft 35 and a chain 37ᵃ trained about such gear and about a relatively larger gear 38 fixed on the adjacent end of the shaft 11. From this arrangement, it will be obvious that upon one revolution of the shaft 35 in the direction of the arrow, as shown in Fig. 1, the yoke 21 is first moved rearward and upward from the position shown in Fig. 1 and then downward and forward returning to its original position. It will be understood that the links 28 not only support the yoke 21 but guide the same during this reciprocating movement.

To obtain a downward and upward movement of the teeth 23 during the reciprocation thereof, the purpose of which will be more fully hereinafter described, I provide the ends of the shaft 35 with cams 39 which are adapted to engage the under side of the parallel portions of the yoke 21 during rotation of the shaft 35 to lift the yoke during its reciprocating movement. The cams are so positioned upon the shaft 35 as to lift the yoke 21 when the latter occupies its extreme rearward position and just before the same is moved forward. In Fig. 2, one parallel portion of the yoke 21 has been broken away to show the construction and positioning of one of the cams 39.

To effectively remove the earth which adheres to the teeth of the rake G, I provide an abutment bar K which is disposed in advance of the belt H and extends transversely of the movable frame E. The abutment bar K is provided adjacent its opposite ends with pins 55 slidable in bearings 56, and a retractile spring 57 surrounding each pin and interposed between the bearings thereof. The springs 57 thus serve to bias the bar K to a predetermined position, which position disposes the bar within the path of movement of the teeth 23 of the rake G, so that when the rake is moved rearwardly the teeth will engage the bar forcing the latter rearwardly. Now, as the teeth 23 move upwardly under the action of the cams 39, the bar K scrapes the surface of the teeth and thus removes the soil therefrom so that they are clean for the next operation.

As previously mentioned, I employ a conveyer belt H which as shown in Fig. 1 is arranged below the movable frame E to receive the grass from the rake E and to convey the same to some remote point for collection. In the present instance, I provide a receptacle 40 arranged at the rear end of the conveyer belt H and pivotally secured to the rear end of the bars 15 of the movable frame E. The conveyer belt H consists of an endless sheet of leather, canvas or the like, which is trained around a pair of shafts 41 and 41ª journaled in bearings 42 formed on the lower end of brackets 43. As clearly shown in Fig. 2, the belt is provided at regular spaced intervals with transverse sets of teeth 44, the teeth of one set being arranged in staggered relation to those of the adjacent set. To drive the conveyer belt, I utilize the driving means for the shaft 35, such shaft being provided with a gear 45 operatively connected to a pintle 46 by means of a gear 47 and a chain 48. The pintle 46 is provided at its outer end with another gear 49 meshing with a gear 50 keyed to a pintle 51, which latter in turn is provided with another gear 52. The gear 52 drives a gear 53 formed on the adjacent end of the shaft 41 by means of a chain 54. Gears 47 and 52 are only shown in dash lines in Fig. 2 as the adjacent portion of the yoke 21 conceals the gears. By this train of gearing, the belt H is driven in the direction of the arrow as shown in Fig. 1, so that the grass deposited thereon is conveyed to the receptacle 40.

In operation, the plow B is moved forward and the soil, which is moved upwardly along the mold board, is thrown into the path of the disintegrating device D. As the latter is rotating in the direction of the arrow shown in Fig. 1, the rapidly rotating teeth 12 strike and break the clods of soil, thus freeing the grass and throwing the same upward. The rake G now moves rearwardly from the position shown in Fig. 1, thereby removing the grass from the teeth of the disintegrating device and drawing the same rearwardly toward the conveyer belt H. The rake G now strikes the bar K whereupon the mechanism moves the rake upwardly so as to draw the teeth along the surface of the bar K, thus removing the dirt and grass from the rake and depositing the same upon the conveyer belt H. The rake now returns to the position shown in Fig. 1 and continues to repeat the operation just described. The grass being deposited upon the conveyer, it is then conveyed to the receptacle 40 as will be understood. It will be obvious that if the rake G should encounter a stone or other obstacle, the teeth 23, the yoke 21, and the adjustable frame F will be free to yield to the obstacle so that the harvester will glide smoothly over such obstacles without detriment to the harvester.

It will be manifest from the foregoing operation that I have provided a grass harvester which will effectively disintegrate the soil to permit the ready removal of the grass therefrom, and a rake which not only removes but conveys the grass from the disintegrating device to the conveyer belt.

Although I have herein shown and described only one form of harvester embodying my invention, it is to be understood that various changes and modifications may be made within the scope of the appended claims without departing from the spirit and scope of this invention.

What I claim is:

1. A grass harvester comprising, in combination with a plow, a rotating, disintegrating device associated with the mold board of said plow, a rake coöperating with said device, a conveyer, and means for actuating said rake to remove the grass from said device and convey the same to said conveyer.

2. A grass harvester comprising, in combination with a plow, means for disintegrating the soil as the same reaches the mold board of said plow, a conveyer, means for removing the grass from the soil after it is disintegrated and transferring it to said conveyer.

3. A grass harvester comprising, in combination with a plow, means for disintegrating the soil as the same reaches the mold board of said plow, a conveyer, and reciprocating means for removing the grass from the soil after it is disintegrated and transferring the same to said conveyer.

4. A grass harvester comprising, in combination with a plow, means for disintegrating the soil as the same reaches the mold board of said plow, a conveyer, and reciprocating, curvilinear means for removing the grass from the soil as it is disintegrated and transferring the same to said conveyer.

5. A grass harvester comprising, in combination with a plow, means for disintegrating the soil as the same reaches the mold board of said plow, a rake coöperating with said means, a conveyer, means for actuating said rake to remove the grass from said device and to convey the same to said conveyer, and means for limiting the movement of said rake in one direction and for removing the soil and grass therefrom.

6. A grass harvester comprising, in combination with a plow, a disintegrating device associated with the mold board of said plow, a rake coöperating with said device, a conveyer, means for actuating said rake to remove the grass from said device and convey the same to said conveyer, and yielding means for limiting the movement of said rake in one direction and for removing the soil and grass therefrom.

7. A grass harvester comprising, in combination with a plow, a rotating disintegrating device associated with the mold board of said plow, a rake coöperating with said device, means for yieldingly mounting the teeth of said rake to prevent breakage of the same, a conveyer, and means for actuating said rake to remove the grass from said device and convey the same to said conveyer.

8. A grass harvester comprising, in combination with a plow, a stationary frame, a disintegrating device carried by said frame, a movable frame carried by said stationary frame, a reciprocating rake mounted on said movable frame and adapted to coact with said device to remove the grass from the soil, a conveyer belt mounted on said movable frame, and means for adjusting the position of said movable frame to vary the working position of said rake with relation to said device.

9. A grass harvester comprising, in combination with a plow, a disintegrating device, a rake coacting with said device, means for reciprocating said rake toward and away from said device, and means for elevating or lowering said rake according as it moves in one direction or the other.

10. A grass harvester comprising, in combination with a plow, a stationary frame, a disintegrating device carried by said frame, a movable frame carried by said stationary frame and normally disposed at an acute angle with relation to the latter, a reciprocating rake carried by said movable frame and arranged to coact with said device, a conveyer belt mounted on said movable frame, means for adjusting the normal position of said movable frame, and means for biasing said movable frame to its normal position.

11. A grass harvester comprising, in combination with a plow, a disintegrating device, a rake coacting with said device, and means for imparting a reciprocating curvilinear movement to said rake comprising a rotary member, a crank connecting said member with said rake for reciprocating the latter, and a cam operable by said rotary member and engageable with said rake at predetermined intervals to lift the same during the reciprocating movement.

12. A grass harvester comprising, in combination with a plow, a disintegrating device, a rake adapted to coact with said disintegrating device, a frame supporting said rake, links pivotally supporting said frame, a yielding connection between said frame and said links, a rotary member, a crank connecting said frame and said rotary member, and cams carried by said rotary member and adapted to engage said frame for lifting the same.

13. A grass harvester comprising, in combination with a plow, a rotary disintegrating device, a rake coöperating with said device, a conveyer belt, teeth on said conveyer belt arranged in staggered relation to each other, a yielding mounted member disposed between said conveyer belt and said device for removing the soil from said rake, and mechanism for moving said rake from said device to said member, upwardly into contact with said member, and then rearwardly and downwardly to again coöperate with said device.

In testimony whereof I have signed my name to this specification.

JUAN ALBERTO VALDERRAMA RICORDI.